Nov. 9, 1926. Re. 16,469

C. A. FRIEDRICH

SOCKET FOR VACUUM TUBES OR THE LIKE

Original Filed Dec. 9, 1921

INVENTOR
Charles A. Friedrich,
BY
ATTORNEY

Reissued Nov. 9, 1926. Re. 16,469

UNITED STATES PATENT OFFICE.

CHARLES A. FRIEDRICH, OF BELLEROSE, NEW YORK, ASSIGNOR TO ALDEN MANUFACTURING COMPANY, OF SPRINGFIELD, MASSACHUSETTS, A CORPORATION OF MASSACHUSETTS.

SOCKET FOR VACUUM TUBES OR THE LIKE.

Original No. 1,505,329, dated August 19, 1924, Serial No. 521,083, filed December 9, 1921. Application for reissue filed August 13, 1926. Serial No. 129,062.

The present invention relates to electric sockets particularly for vacuum tubes used in electric wireless apparatus.

It is well known that the transmission of outside vibrations through the tube socket to the vacuum tube in radio transmitting and receiving devices is very detrimental to the proper functioning of such tubes. If these vibrations are of large amplitude, it is quite possible that the electrodes in the tubes may be thrown together, causing short circuits and probably burn-outs of the tube filament or of its associated apparatus. Also, these vibrations, by periodically displacing the elements, change the characteristics of the tube, thus causing modulation in such devices as are used for radio frequency, and direct changes of anode current in those used at audio frequencies, either of which phenomena result in the conversion of mechanical vibrations into audio frequency currents in the output of the system.

Various devices have been constructed to absorb such outside vibrations and shocks but most of such devices are too cumbersome and not sufficiently sensitive. Besides, such devices require too much valuable space in wireless apparatus.

In order to overcome these inconveniences, inefficiencies and drawbacks, I have constructed a novel vacuum tube socket which is equipped with means for absorbing outside vibrations, shocks, etc., and which is adapted to occupy comparatively small space.

With this object in view, my invention consists in that, contrary to the existing sockets in which the tube is held substantially non-yielding in the socket, my new socket is provided with shock absorbed combined contacting and holding means which will support the tube so as to hold it yieldingly and out of physical contact with the socket proper, these means largely preventing transmission of mechanical vibration to the tube and its elements.

Figure 1:
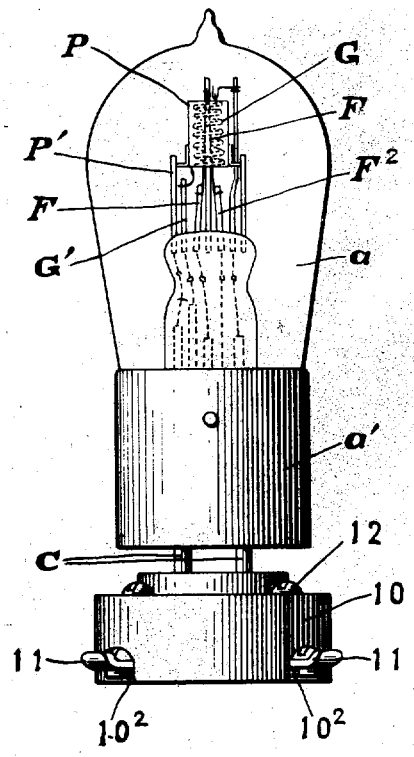
Figure 2:
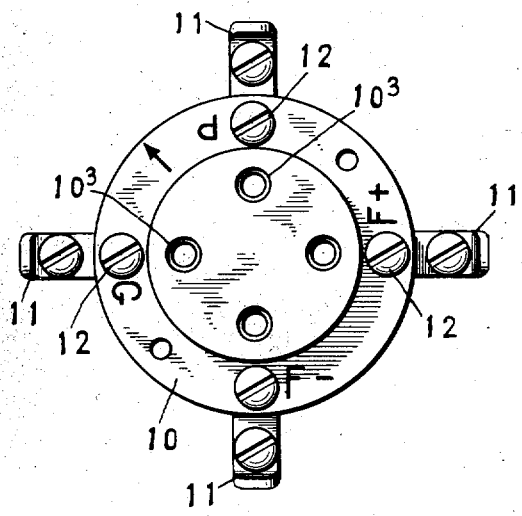
Figure 4:
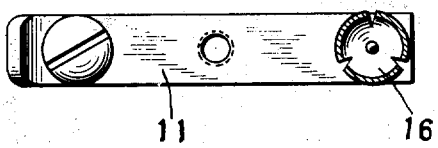
Figure 3:
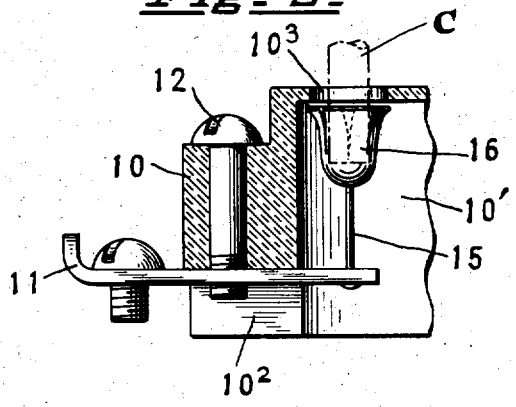

My invention will be more fully understood by reference to the accompanying drawing in which similar reference characters denote corresponding parts and in which, Fig. 1 is an elevation of a vacuum tube equipped with my novel socket; Fig. 2 is an enlarged top plan view of the socket proper; Fig. 3 is an enlarged vertical sectional view of one part of the socket; Fig. 4 is a plan view and section of one of the socket members.

Referring to the drawing more in detail *a* denotes the bulb ordinarily called the vacuum tube and generally used in wireless systems for receiving or sending purposes. In this tube P denotes the so-called plate made in form of a sleeve which encloses the grid G and filament F, the grid, filament and plate being insulated from one another and conductively connected to the leads F′, F², G′ and P′, which pass through the insulation stem S and connect with wires W, leading to the contact pins or prongs C projecting from the base or sleeve *a′* of the tube.

In previous constructions of sockets for vacuum tubes, the electric connections between the terminal prongs of the vacuum tube and its associated apparatus have been effected by means of a socket enclosing the base of the tube, said socket being provided with a number of springs adapted to make direct contact with said prongs. Such sockets are usually fixed to a stationary structure such as a panel, panel board frame or receiving set. When the tube is engaged in such a socket, it forms with it a substantially rigid piece so that shocks or vibrations to which the complete apparatus may be subjected are transmitted directly to the elements of the tube. This detrimental effect I have avoided in the following manner.

The base 10 according to this invention, comprises a disk of insulating material hollow as at 10′ and open at its bottom and which is formed in its top with a plurality of perforations 10³. At its bottom the disk is formed with radial grooves 10² through which extend metal arms 11 forming the terminals for the electric wires (not shown).

These arms are held in position by screws 12 fixed in the disk. There are as many perforations as there are prongs or pins to the vacuum tube. In the present case, the usual number, four, is shown and the same are arranged and register with the prongs of the vacuum tube. These perforations are of somewhat greater diameter so that the prongs may freely pass through said perforations. Arranged in the hollow 10′ of the disk are the expandable cup like sockets 16 made of spring material and having longitudinal slits so that they may be expanded by the prongs of the vacuum tube and will grip the same firmly. These sockets are suitably secured in an upright position to the inner ends of the terminal arms 11 by the resilient metallic stem-like member 15 and are positioned to extend close to the inner face of the top of the disk and to register with the perforations $10^3$ therein. The sockets 14 firmly engage the prongs of the tube passing through the perforations $10^3$ of the disk and thereby not only hold the tube securely in position but also form an effective contact, movable universally.

The length of the stem 15 is such that the tube will be held at an elevation from the upon face of the disc creating a free space between the bottom of the tube base $a'$ and the disc sufficient to prevent physical contact and the transmission of shocks thereby from the socket to the tube. These sockets 16 are also so positioned that the tube prongs will be held substantially in the center of the holes $10^3$ so that there is a free space surrounding the prongs which prevents transmission of lateral shocks from the base 10. Of course, instead of stems other shock absorbing means may be employed.

Owing to the flexible support 15 of the contact socket members 16 and also the expandability of the latter, the yielding engagement of the prongs C will be insured even though the latter may be of somewhat improper size or spacing due to some fault of manufacture or having been accidentally bent.

The tube base $a'$ is usually provided with a pin or projection K. This pin is utilized in the present construction of the socket to facilitate the positioning of the vacuum tube relative to the socket 10. On the upper face of the socket an arrow (see Fig. 2) is marked indicating the position of the pin K when inserting the tube, so that the wires may be properly connected to the corresponding electrodes. The latter may be marked, as shown, on the disk opposite the terminals.

The top of the insulating disk 10 serves as a positive stop for the base $a'$ of the vacuum tube in case the contacts fail to limit the insertion of the prongs. The said top plate also serves to limit the lateral tilting action of the tube either by the engagement of the prongs C with the sides of the prong openings $10^3$ of the tube base with the outer edge of the insulating disk. The insulating top piece with the holes $10^3$ also serves as a guide for the prongs or pins C when inserting the same to the contacts and prevents undue twisting of the tube and contacts.

There may be other modifications made by those skilled in the art without departing from the principle of my invention. I therefore, do not wish to restrict myself to the details shown and described. The invention is broadly claimed in my concurrent reissue application No. 129,061.

What I claim and desire to secure by Letters Patent is:—

1. A socket for a vacuum tube having four projecting prongs comprising an insulating support having four spaced apertures for the prongs, conducting members each consisting of an anchorage portion, a contact portion and a spring portion electrically connecting the contact portion to the anchorage portion, the anchorage portions of said members extending outwardly beyond the apertures and being secured to said insulating support at points spaced apart circumferentially of the apertures and insulated from each other and each contact portion having spring fingers for frictionally engaging the sides of the prongs of a tube and the walls of said apertures serving to limit the twisting of the tube and prongs when the prongs are engaged by said fingers.

2. A socket for a vacuum tube having four projecting prongs, an insulating base having a recess, a plurality of electrical conducting members carried by said base and insulated from each other and arranged spaced apart circumferentially about the axis of the base, each conducting member consisting of a contact portion, a spring portion and an anchorage portion, the contact portion being located in said recess and serving to electrically engage the end and also the side of a tube prong and the anchorage portion extending laterally outward from said recess and secured to said base, and means for limiting the rotation of a tube when the prongs are in engagement with said contact portions.

3. In a socket for a vacuum tube having projecting contact prongs, an insulating base, terminal members fixed to said base, resilient conducting stems terminating in expandable cups adapted to engage said contact members so as to support the vacuum tube out of physical contact with said base.

4. In a socket for vacuum tubes having contact prongs, a hollow insulation base having in one of its faces apertures for the free passage of said prongs, radial terminal strips secured to the opposite face of said base and projecting into the hollow thereof, resilient stems secured to the inner ends of said terminal strips and contacting cups adapted to engage said prongs so as to support the vacuum tube at an elevation from, and out of physical contact with said base.

5. In a socket for vacuum tubes having contact prongs, a hollow insulation base having in one of its faces apertures for the free passage of said prongs, radial terminal strips secured to the opposite face of said base and projecting into the hollow thereof, resilient stems secured to the inner ends of said terminal strips and contacting cups adapted to engage said prongs so as to support the vacuum tube at an elevation from, and out of physical contact with, said base, and means for limiting the twisting of a tube when its prongs are in said cups.

6. A vacuum tube socket comprising an insulating base, a plurality of terminal bars secured radially to said base, flexible conducting members secured vertically to said bars and having at their upper ends expandable contact cups, and means for limiting the twisting of a tube when its prongs are in said cups.

7. A vacuum tube socket comprising an insulating support, a plurality of terminal strips secured thereto, a resilient stem secured to the inner end of each terminal member and an expandable contact cup mounted on the upper end of each stem and means for limiting the tilting of the tube when mounted in the socket.

8. A vacuum tube socket comprising an insulating base, a plurality of terminal bars secured radially to said base, flexible conducting members secured vertically to said bars and having at their upper ends expandable contact cups and means independent of the cups for limiting the depth of insertion of the prongs of a tube.

CHARLES A. FRIEDRICH.